No. 853,182. PATENTED MAY 7, 1907.
T. LOWTHER.
STEAM GENERATOR.
APPLICATION FILED OCT. 13, 1906.

Witnesses:
Johanne Daumberger.
Edward Wolff

Inventor:
Thomas Lowther
by Max W. Ordmann
Attorney.

No. 853,182. PATENTED MAY 7, 1907.
T. LOWTHER.
STEAM GENERATOR.
APPLICATION FILED OCT. 13, 1906.

Witnesses:
Johanne Daumberger.
Edward Wolff

Inventor:
Thomas Lowther
by
Max L. Ordmann
Attorney

THE NORRIS PETERS CO., WASHINGTON, D. C.

No. 853,182. PATENTED MAY 7, 1907.
T. LOWTHER.
STEAM GENERATOR.
APPLICATION FILED OCT. 13, 1906.

No. 853,182. PATENTED MAY 7, 1907.
T. LOWTHER.
STEAM GENERATOR.
APPLICATION FILED OCT. 13, 1906.

Witnesses:
Johanne Daumberger
Edward Wolff

Inventor:
Thomas Lowther
by
Max D. Ordmann
Attorney

No. 853,182.

PATENTED MAY 7, 1907.

T. LOWTHER.
STEAM GENERATOR.
APPLICATION FILED OCT. 13, 1906.

No. 853,182. PATENTED MAY 7, 1907.
T. LOWTHER.
STEAM GENERATOR.
APPLICATION FILED OCT. 13, 1906.

Witnesses:
Johanne Daumberger.
Edward Wolff

Inventor:
Thomas Lowther
by
Max W. Ordmann
Attorney

No. 853,182. PATENTED MAY 7, 1907.
T. LOWTHER.
STEAM GENERATOR.
APPLICATION FILED OCT. 13, 1906.

UNITED STATES PATENT OFFICE.

THOMAS LOWTHER, OF EKATERINOSLAF, RUSSIA.

STEAM-GENERATOR.

No. 853,182.  Specification of Letters Patent.  Patented May 7, 1907.

Application filed October 13, 1906. Serial No. 338,743.

*To all whom it may concern:*

Be it known that I, THOMAS LOWTHER, a subject of the King of Great Britain and Ireland, residing at Ekaterinoslaf Government, South Russia, have invented Improvements in Steam-Generators, of which the following is a specification.

This invention relates to steam generators and has for its object to so combine and arrange a number of steam generating or evaporative elements or units as to produce a boiler of simple construction possessing a higher efficiency than the constructions hitherto commonly used.

A steam generator according thereto comprises two or more sets of horizontal and transversely arranged water containing and steam generating conduits or drums (hereinafter called drums) of comparatively large size arranged one above the other and connected together at their ends through one or more pairs of main vessels or drums extending longitudinally with reference to the general dimensions of the boiler and hereinafter called the longitudinal drums, the arrangement being such that the transverse drums of the several sets are not located directly one above the other but are displaced horizontally relatively to one another so that those of one set are opposite spaces between those of the other set or next adjacent set so as to form an undulating path, extending more or less in a horizontal direction, for the heating gases passing from the fire grate to the uptake or chimney stack.

Each set of transverse conduits or drums may be connected at their ends to a pair of longitudinal main drums so as to form therewith a separate element, two or more such elements being placed one over the other with the longitudinal drums directly one above the other and connected together, as by tubular connections or branches between them. Or, the lower set of transverse drums may be connected to a pair of longitudinal drums across which the next set of transverse drums are placed and connected near their ends to the top of such longitudinal drums. Upon the top of the second set of transverse drums may, if desired, be placed another element comprising transverse and longitudinal drums, the uppermost transverse drums, or longitudinal drums being connected to one or more steam drums, vessels or pipes which may be arranged longitudinally. The arrangement in each case may be such that the flame and hot gases are caused to pass through the space between the lower and next upper set of transverse drums direct to a chimney at the end of the steam generator opposite to the front or fire box end, or be led back over the tops of the second set of transverse drums to a chimney or uptake at the front or fire box end of the steam generator; or be again led back over the tops of the second set of transverse drums to a chimney at the rear end of the steam generator. In this way a steam generator having a very effective heating surface is provided whereby a high evaporative efficiency is obtained. To still further increase the evaporative efficiency, the transverse conduits or drums of one element may be connected to those of the adjacent element or elements by small water or steam tubes, according to their position, extending across the path for the hot gases. As the longitudinal and transverse drums are of comparatively large size, they can be readily cleaned out when necessary.

The details of construction can be variously modified but by way of example, a few constructions will now be described with the aid of the accompanying illustrative drawings from which the scope of the invention will be readily ascertained.

In these drawings.

Figure 1:
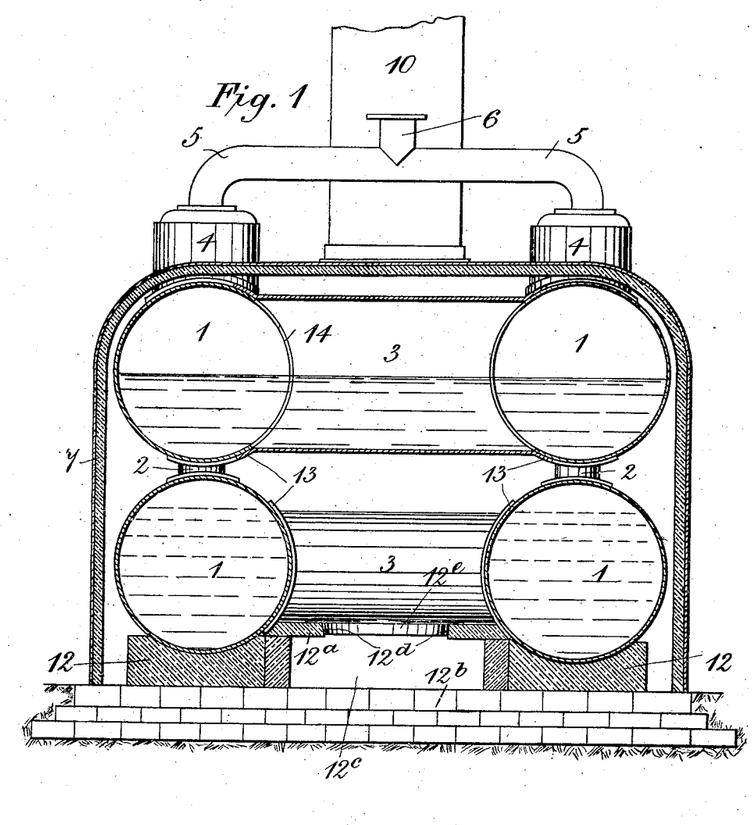
Figure 1 is a transverse section and Fig. 2 a longitudinal section, showing one construction of steam generator according to this invention.
Figure 2:
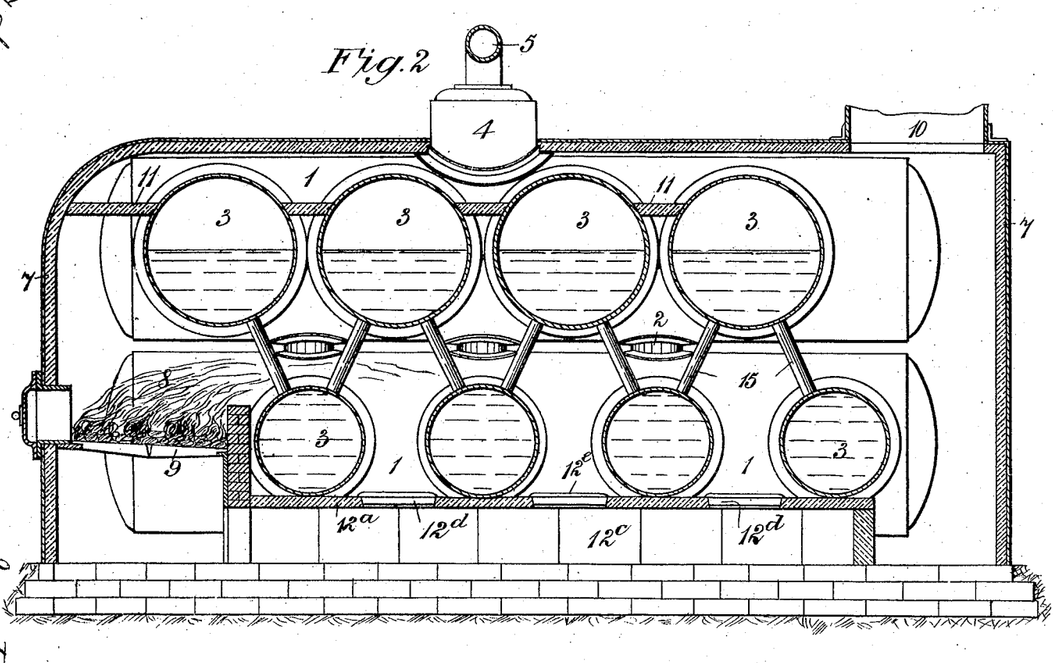

According to the construction of boiler shown in Figs. 1 and 2, there are two superposed elements each comprising a pair of longitudinally arranged cylindrical vessels or drums 1, and a set of transverse drums 3. The longitudinal drums 1 of the two pairs are in substantially horizontal planes at different levels and those that are directly one above the other are connected together by a number of circulating tubes or tubular connections 2. The transverse drums 3 connecting the pair of longitudinal drums 1 of each element may be of any convenient number and, in the example, are of smaller diameter than the main drums 1, those in the lower set being also smaller in cross section than those in the upper set which in this example serve as water and steam drums. The transverse drums 3 for each pair of main longitudinal drums 1 are pitched equidistantly whether the number be the same for each pair or not, but the pitch centers of the transverse drums 3 of one pair of main drums are not in the same vertical planes as those of the other pair but are displaced with respect thereto, preferably to the extent of half the pitch dimension as is clearly illustrated. The upper longitudinal drums 1 are provided with steam domes 4 that are connected by branch steam pipes 5 to a steam supply pipe 6 common to them.

Figure 3:
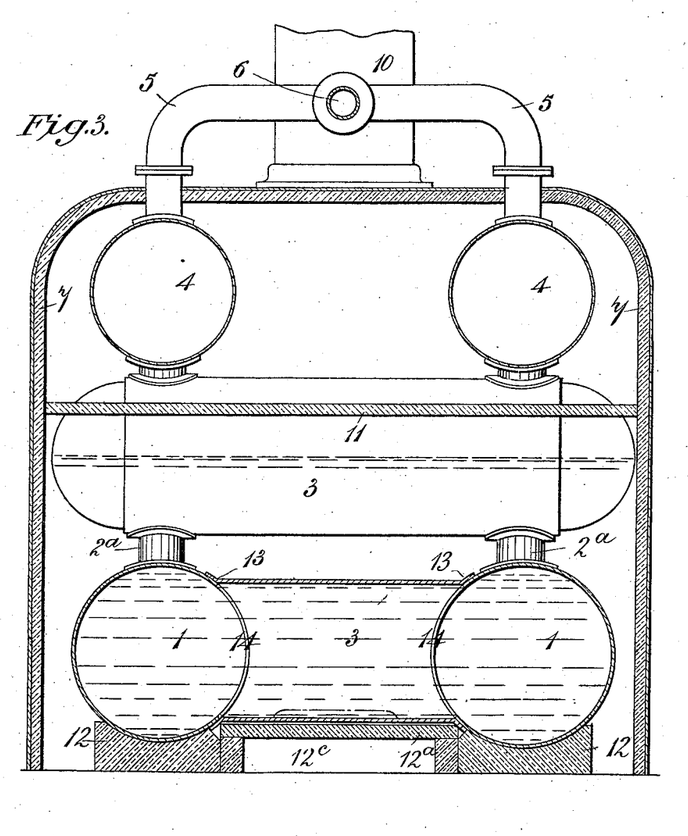
Figs. 3 and 4 are views similar to Figs. 1 and 2 respectively showing a modified construction of the steam generator.
Figure 4:
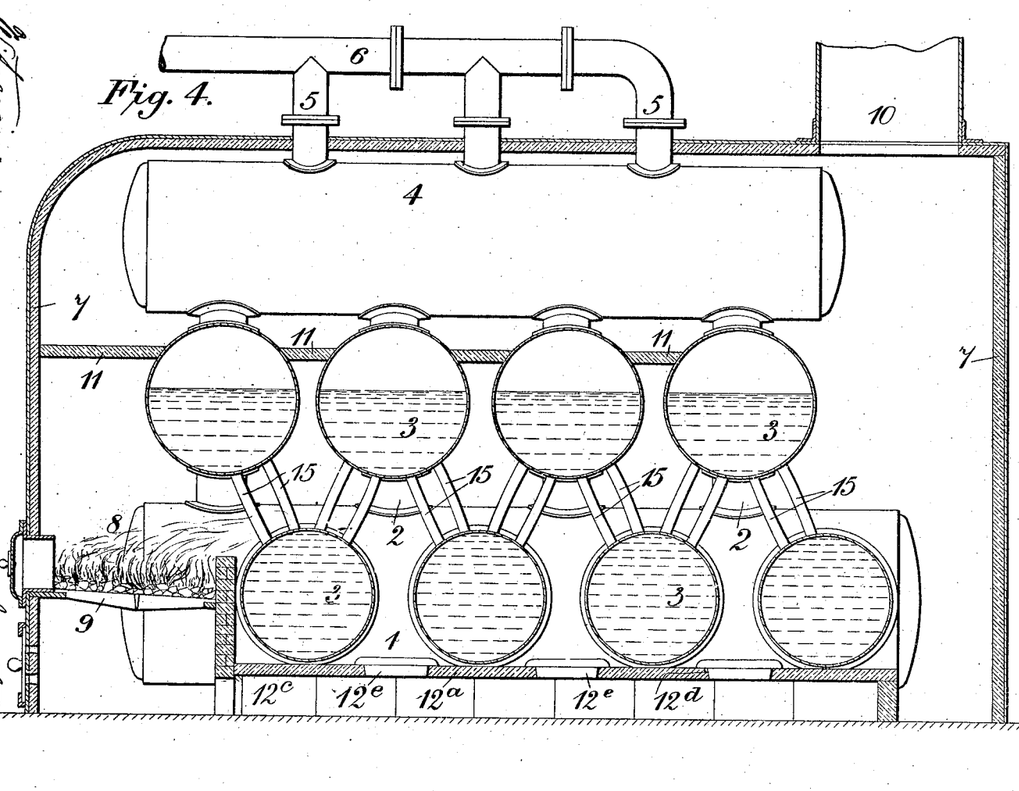

In the construction shown in Figs. 3 and 4, there is a lower element of the kind hereinbefore described comprising a pair of longitudinal drums 1 connected by a set of tranverse drums 3, and a second set of transverse drums 3 arranged across and connected by tubular connections 2ª to the tops of the pair of longitudinal drums 1 of the lower element. Extending longitudinally across and connected to the end portions of the second set of transverse drums 3 are two longitudinal steam pipes, vessels or drums 4 that are connected by branch pipes 5 to a steam supply pipe 6 common to them.

Longitudinal and transverse drums constructed and arranged in the manner indicated, constitute, with the aid of an appropriate inclosing casing 7 or setting, a very effective steam generator of high evaporative order.

The fire box 8 may, in each case, as shown, be located at or near the level of the center of the lowermost pair of main cylindrical drums 1, the grate 9 extending inwardly so that it is overhung by a portion of one of the transverse drums 3 of the upper set of such drums. The arrangement is such that the flame and gases from the furnace will, as indicated, follow an undulating path by impinging upon and being alternately deflected by the several transverse drums 3 until the uptake or chimney 10 is reached. The casing 7 for inclosing the several elements may, as shown, conveniently be made of sheet metal lined with asbestos or other good or suitable incombustible and heat resisting material. The spaces between the transverse drums 3 in each set thereof, except the bottom set, may conveniently be closed at or near the top by fire brick slabs 11 or equivalent refractory materials. The lowest longitudinal drums 1 may, as shown, be mounted upon correspondingly curved supports 12.

The spaces between the transverse drums 3 in the lower set thereof are closed at the bottom as by a horizontal partition 12ª between which and the floor 12ᵇ is an ash pit or chamber 12ᶜ. In the partition 12ª are openings 12ᵈ that are normally closed by cover plates 12ᵉ but through which ashes that may accumulate between the said drum 3 can be allowed to fall into the ash pit 12ᶜ by lifting the cover plates 12ᵉ.

Figure 5:
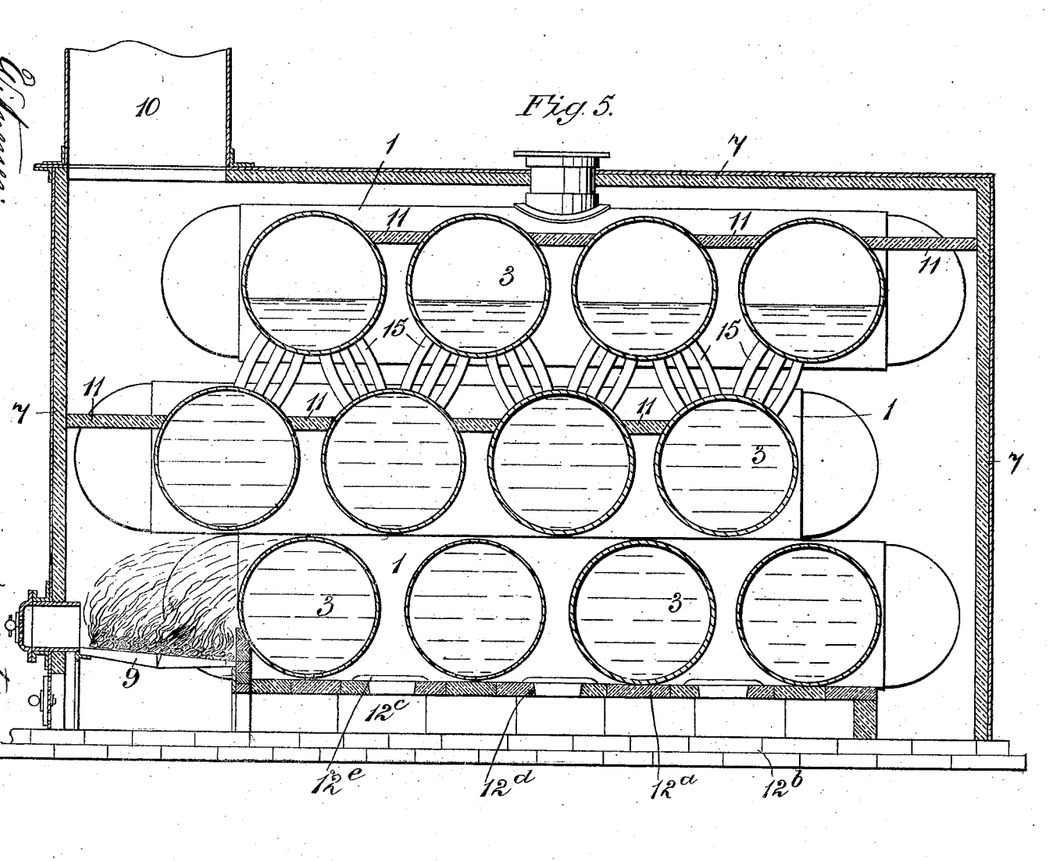
Fig. 5 shows in longitudinal section, a construction of the steam generator wherein the heating gases are caused to return from the back of the boiler to be liberated at the front end thereof.

In some cases, the hot gases may be led back over the tops of the upper transverse drums before reaching the uptake or chimney so as to superheat the steam in such drums and in the upper main longitudinal drums 4 or equivalent. Such an arrangement is shown in Fig. 5 wherein three elements each consisting of two longitudinal drums 1 and a set of transverse drums 5 are arranged one above the other, the flame and hot gases being led rearward between the lowest and next upper sets of transverse drums 3 and forward between the second and upper sets of transverse drums to the chimney 10 at the front end of the steam generator.

The transverse drums 3 may be connected to the longitudinal drums 1 in any suitable or well known manner, as for example by forming them with flanged ends 13 (see Figs. 1 and 3) adapted to fit over holes 14 in the sides of the longitudinal drums 1, and riveting the flanges to the latter drums.

Figure 6:
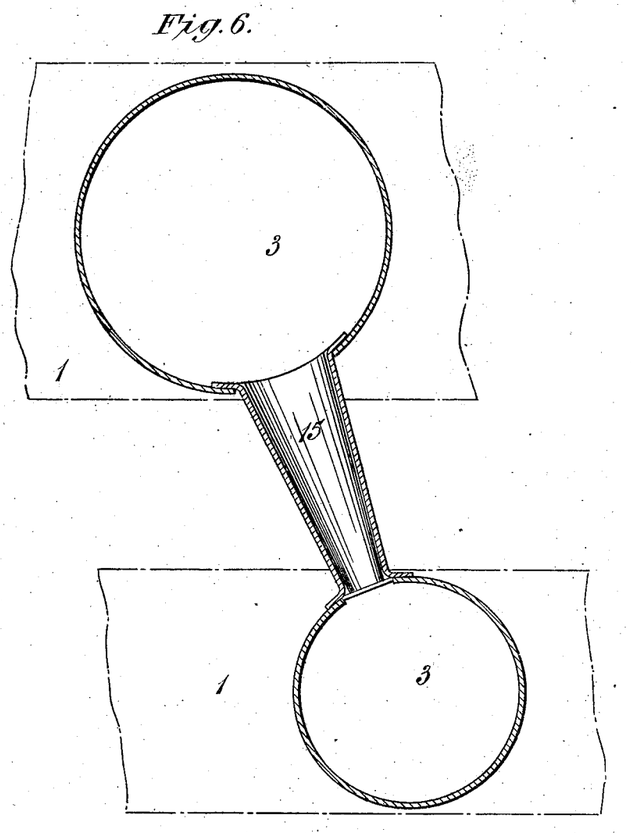
Figs. 6 and 7 show in cross section, portions of a steam generator provided with two different arrangements of auxiliary heating tubes.
Figure 7:
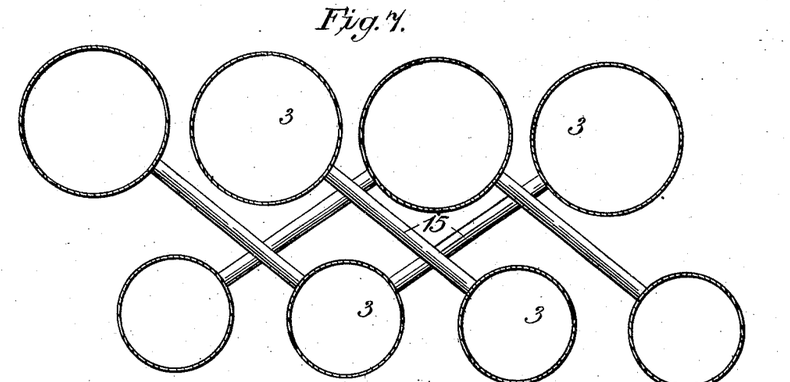

As a modification, to increase the heating surface exposed to the action of the gases proceeding from the furnace, the transverse drums 3 that are located at one level may be connected with those at another level by tubes of any desired dimensions and number. There may be a single transverse row of tubes 15 of constant cross section connecting corresponding drums 3 of the superposed sets as shown in Fig. 2, or of varying cross section as shown in Fig. 6. Further, the drums 3 of the superposed sets which do not correspond may be connected by tubes 15, as shown in Fig. 7. Or, in lieu of a single row of tubes 15, several such rows may be arranged between adjacent parts of the transverse drums 3, as shown for example in Fig. 4, where two rows are adopted, the individual tubes being curved so that their ends are at right angles to the walls of the drums 3 to enable them to be readily fixed thereto. Fig. 5 shows three rows of connecting tubes 15 between some of the transverse drums, the outer rows being curved and the inner row straight. It will be understood that cross connecting tubes such as just described, may be applied between any sets of superposed transverse drums 3 shown in the preceding Figs. 1 to 5.

Figure 8:
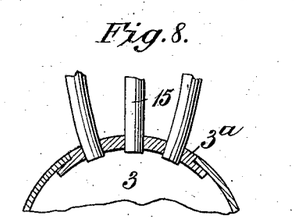
Fig. 8 is a sectional detail view showing part of a transverse drum with rows of auxiliary tubes connected thereto.

Fig. 8 is a section of a portion of one of the transverse drums 3 illustrating the manner in which the tubes 15 are preferably connected thereto, 3ᵃ being a tube plate which, for the major portion of its circumferential length, is thicker than its edges 3ᵃ, or of the plates of the drum 3 to which it is to be riveted, so that sufficient metal is afforded to enable a good joint to be made between the drum and the tubes 15 when the latter are inserted and expanded in holes therein.

Some of the tubes 15 will be water tubes, and some, such as those that may connect together portions of transverse drums that are above the water level, will be steam tubes.

Figure 9:
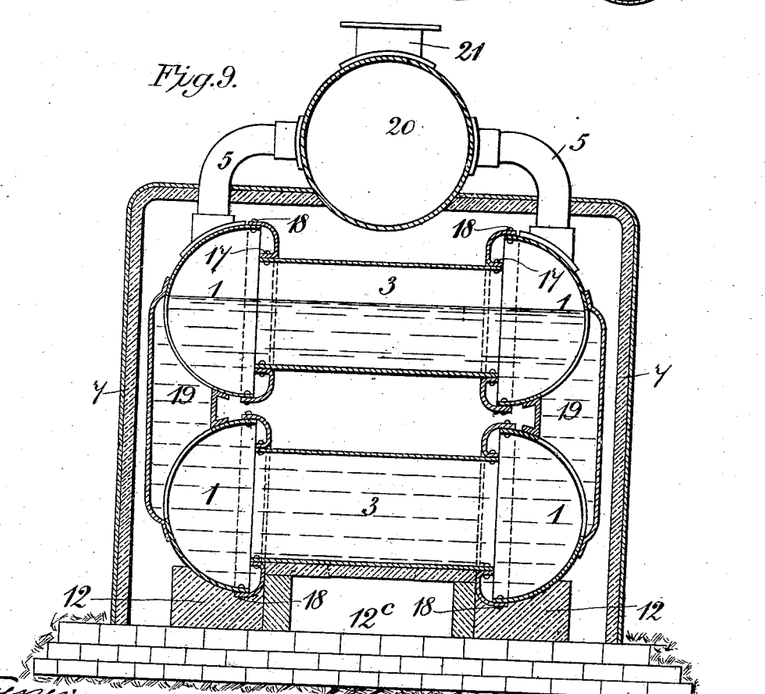
Figs. 9 and 10 are similar views to Fig. 1 and Fig. 11 a similar view to Fig. 2, showing other modified constructions of steam generators according to this invention.

Also, as a further modification, the main or longitudinal drums 1 referred to, in lieu of being cylindrical may, in some cases, and as shown for example in Fig. 9, be semi-cylindrical in cross section, the transverse conduits 3 being cylindrical or drum shaped, as before, and connected to the flat sides of such main drums 1. This connection may be effected in any well known manner. Conveniently it may be effected by flanging the holes in the flat plates to which the transverse drums 3 are to be connected, as at 17, and inserting the transverse drums in such holes and riveting them to the flanges 17 which are preferably arranged, as shown, at the inner side of the plates or main drums 1 so that the rivets 18 will not be exposed to the hot gases. In this example, the longitudinal drums 1 are connected together by vertical laterally arranged tubes 19, and the upper longitudinal drums 1 are connected by branch pipes 5 to a common steam drum 20, having an outlet at 21.

Figure 10:
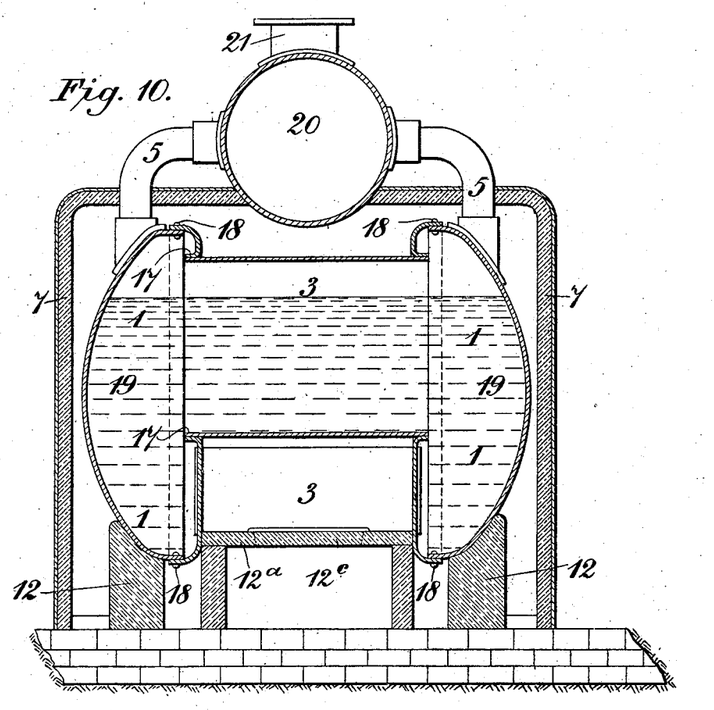

Fig. 10 shows a further modified construction of the steam generator according to which two superposed sets of transverse drums 3 are connected at their ends to the inner flat sides of two longitudinal vessels or drums 1 common to them, the arrangement in other respects being similar to that shown in Fig. 9.

Figure 11:
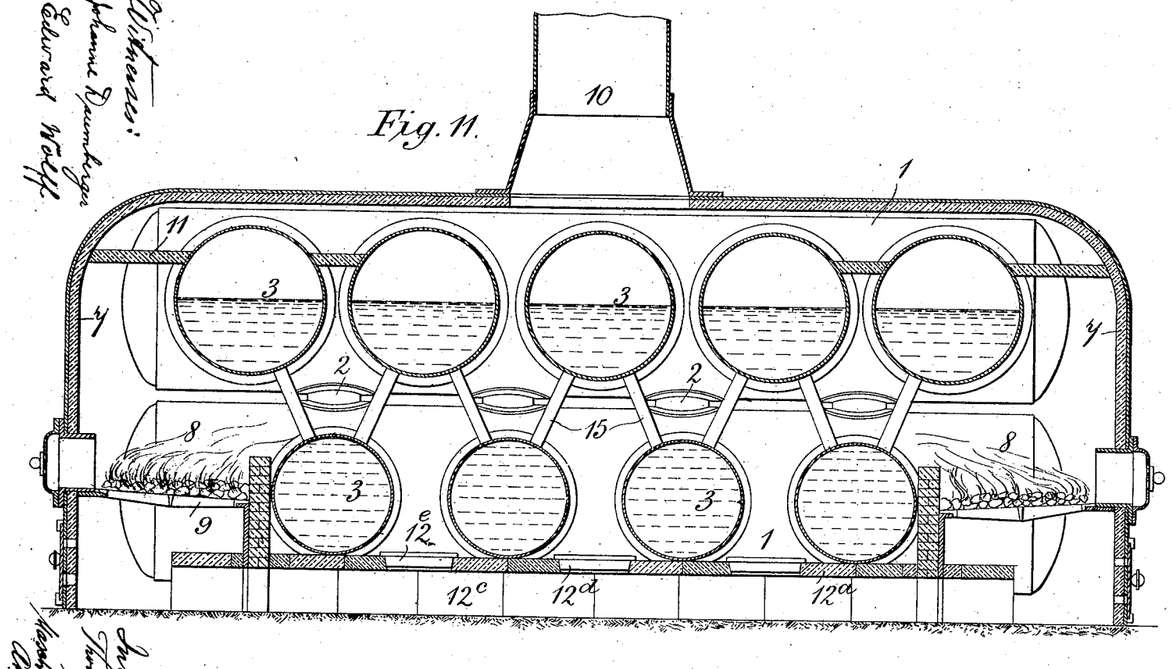

Fig. 11 shows a steam generator of the kind hereinbefore described but made double ended, that is to say, with a furnace chamber 8 at each end and with a chimney or uptake 10 at or near the center of its length.

In each case, the ends of the longitudinal drums 1, and also those of the transverse drums 3 that are placed across the longitudinal drums, as in Figs. 3 and 4, are or may advantageously be made of dished, semi-spherical or other convex shape for the purpose of strengthening them.

In Figs. 2, 4 and 11 the drums 1 are shown with dished ends and in Figs. 3 and 5 with semi-spherical ends.

As usual, suitable valve controlled pipe connections are provided at convenient points, for feeding water to the boiler, blowing-off purposes and for conducting the steam to the engine or other place where it is to be utilized.

The details of construction can be variously modified.

What I claim is:—

1. In a steam generator, a plurality of horizontal and transversely arranged drums located in sets one above the other, said sets of drums being in communication with each other at their ends and the transverse drums thereof arranged to form an undulating path between the sets.

2. In a steam generator, a plurality of horizontal and transversely arranged drums located in communicating sets one above the other, a fire box, and an uptake or chimney, said sets of drums being arranged to form an undulating path between them from said fire box to said chimney or uptake.

3. In a steam generator, the combination with longitudinal or main drums, of a plurality of horizontal and transversely arranged drums located in sets one above the other and connected at their ends to said longitudinal or main drums so as to provide an undulating path for the heating gases, as set forth.

4. In a steam generator, the combination with longitudinal or main drums, of a plurality of horizontal and transversely arranged drums located in superposed sets displaced horizontally with respect to each other and connected at their ends to said longitudinal or main drums.

5. In a steam generator, the combination with longitudinal or main drums, of a plurality of horizontal and transversely arranged drums located in superposed sets, the pitch centers of the drums of one set being displaced to the extent of half the pitch dimension with respect to the transverse drums of the set next in order.

6. In a steam generator, the combination with a plurality of longitudinal or main drums arranged in superposed pairs, of a plurality of horizontal and transversely arranged drums connected in sets to said longitudinal or main drums so as to provide an undulating path for the heating gases between them, and means for connecting together the superposed pairs of main drums.

7. In a steam generator, the combination with a plurality of longitudinal or main drums arranged in superposed pairs, of a plurality of horizontal and transversely arranged drums connected to said longitudinal or main drums in sets displaced horizontally with respect to each other, and means for connecting together corresponding main drums of adjacent pairs.

8. In a steam generator, the combination with a plurality of longitudinal or main drums arranged in superposed pairs, of a plurality of horizontal and transversely arranged drums connected to said longitudinal or main drums in sets, the pitch centers of the individual drums of one of which are displaced to the extent of half the pitch dimension with respect to the individual drums of the set next in order, and means for connecting together corresponding drums of adjacent pairs of longitudinal or main drums.

9. In a steam generator, the combination with a plurality of longitudinal or main drums of a plurality of horizontal and transversely arranged drums connected to said longitudinal or main drums in sets displaced horizontally with respect to each other, and tubes connecting drums in one set with drums in an adjacent set.

10. In a steam generator, the combination with a plurality of longitudinal or main drums arranged in superposed pairs, of a plurality of horizontal and transversely arranged drums connected to said longitudinal or main drums in sets displaced horizontally with respect to each other, and tubes extending between drums in the adjacent sets of drums.

11. In a steam generator, the combination with a plurality of longitudinal or main drums arranged in superposed pairs, of a plurality of horizontal and transversely arranged drums connected to said longitudinal or main drums in sets displaced horizontally with respect to each other and tubes extending between corresponding drums of such sets aforesaid as are adjacent.

12. In a steam generator, the combination with a plurality of longitudinal or main drums arranged in superposed pairs, of a plurality of horizontal and transversely arranged drums of smaller cross sectional dimensions than said longitudinal or main drums and connected at opposite ends thereto in sets displaced horizontally with respect to each other, and tubular connections smaller in cross section than either of the longitudinal or transverse drums and connecting directly the longitudinal drums of the pairs which are adjacent.

13. In a steam generator, the combination with a pair of longitudinal or main drums semi-cylindrical in cross section, of a plurality of horizontal and transversely arranged drums having their ends connected to the flat sides of the longitudinal or main drums, as set forth.

14. In a steam generator, the combination with longitudinal or main drums, of a plurality of horizontal and transversely arranged drums located in sets one above the other and connected at their ends to the longitudinal or main drums, and means for providing an undulating and tortuous path for the heating gases through the generator.

15. A steam generator comprising in combination, a plurality of longitudinal or main drums, a plurality of horizontal and transversely arranged drums connected at their ends to the longitudinal or main drums and located in sets displaced horizontally with respect to each other, tubular connections between the several adjacent main drums, a fire grate adjacent to the first of the series of drums of the lowermost transverse set, a casing or generator setting for inclosing the several elements, means for conveying away the steam from the uppermost drums, and a chimney or uptake leading from the interior of said casing.

16. A steam generator comprising in combination, a plurality of longitudinal or main drums, a plurality of horizontal and transversely arranged drums connected at their ends to the longitudinal or main drums and located in sets displaced horizontally with respect to each other, tubes connecting the transverse drums in one set with those in an adjacent set and arranged in the path of the hot gas passing through the space between the adjacent sets of transverse drums, tubular connections between the several adjacent main drums, a fire grate adjacent to the first of the series of drums of the lowermost transverse set, a casing or generator setting for inclosing the several elements, means for conveying away the steam from the uppermost drums, and a chimney or uptake leading from the interior of said casing.

Signed at London England this 18th day of September 1906.

THOMAS LOWTHER.

Witnesses:
   H. D. JAMESON,
   F. L. RAND.